(12) United States Patent
Lin et al.

(10) Patent No.: US 7,900,218 B2
(45) Date of Patent: Mar. 1, 2011

(54) TRAY USED IN AN OPTICAL DISK DRIVE

(76) Inventors: Ke Rong Lin, Taipei (TW); Hsin-Tso Chen, Taipei (TW)

( * ) Notice: Subject to any disclaimer, the term of this patent is extended or adjusted under 35 U.S.C. 154(b) by 0 days.

(21) Appl. No.: 12/474,120

(22) Filed: May 28, 2009

(65) Prior Publication Data

US 2009/0241139 A1    Sep. 24, 2009

Related U.S. Application Data

(63) Continuation of application No. 10/988,517, filed on Nov. 16, 2004.

(30) Foreign Application Priority Data

Nov. 20, 2003  (TW) .............................. 92220496 U

(51) Int. Cl.
*G11B 33/02* (2006.01)
(52) U.S. Cl. ...................................................... 720/601
(58) Field of Classification Search .......... 720/600–614
See application file for complete search history.

(56) References Cited

U.S. PATENT DOCUMENTS

| 6,345,027 | B1 * | 2/2002 | Saji et al. ..................... 720/607 |
| 7,191,455 | B2 * | 3/2007 | Murata et al. ............... 720/626 |
| 2004/0168176 | A1 * | 8/2004 | Chan et al. ................... 720/619 |
| 2005/0022215 | A1 * | 1/2005 | Kim ........................... 720/601 |
| 2005/0066341 | A1 * | 3/2005 | Tokunaga ................... 720/606 |
| 2005/0204373 | A1 * | 9/2005 | Ueno et al. .................. 720/616 |

* cited by examiner

*Primary Examiner*—Mark Blouin
(74) *Attorney, Agent, or Firm*—Bobby B. Soltani; Davis Wright Tremaine, LLP

(57) ABSTRACT

The present invention relates to a tray used in an optical disc drive. At least two aligning means arranged in the tray for marking an aligning line at a front side and a back side of the tray, respectively. The aligning line is used for determining the dimensional accuracy of each component located on the front side and back side of the tray, respectively.

19 Claims, 4 Drawing Sheets

TRAY USED IN AN OPTICAL DISK DRIVE

FIELD OF THE INVENTION

The present invention relates to a tray used in an optical disc drive, and particularly to having aligning means formed integrally with the tray and the aligning line formed through the aligning means used for determining the dimensional accuracy of each component located on the front side and back side of the tray, respectively.

BACKGROUND OF THE INVENTION

FIG. 1 shows the structural diagram of a front side of a tray of a conventional optical disc drive, and FIG. 2 shows a structural diagram of a back side of the tray of the FIG. 1. After the conventional tray 10 is made, e.g. the conventional tray 10 made by using an extrusion, the tray 10 has to be measured precisely to make sure the size of each component arranged on the tray 10 and the relative sizes between the components. These sizes must meet a product specification such that they can be really arranged in the optical disc drive. After a measurer finishes measuring each component on the front side of the tray 10, he will continue to measure each component on the back side of the tray 10. Since the front side and the back side of the tray 10 do not have a common measuring standard, when measuring the back side of the tray 10, the tray 10 has to be turned to the back side from the front side. However, as soon as the tray 10 moves, the measuring standard will have deviation, and the tray 10 cannot precisely keep the measuring standard used by the front side and that used by the back side. Therefore, it is hard to measure the tray 10 more precisely.

In view of the shortcomings of the above mentioned prior art, the inventor of the present invention wants to improve and invents a tray with a measuring dimensional accuracy mechanism.

SUMMARY OF THE INVENTION

It is an object of the present invention to provide a tray with a measuring dimensional accuracy mechanism.

To achieve the above mentioned object of the present invention, the present invention provides a tray-used in an optical disc drive which comprises: at least two aligning means arranged in a tray for marking an aligning line on a front side and a back side of the tray, respectively; and the aligning line is used for determining a dimensional accuracy of each component located on the front side and back side of the tray, respectively.

BRIEF DESCRIPTION OF THE DRAWINGS

The present invention can be more fully understood by reference to the following description and accompanying drawings, in which.

DETAILED DESCRIPTION OF THE INVENTION

Figure 1:
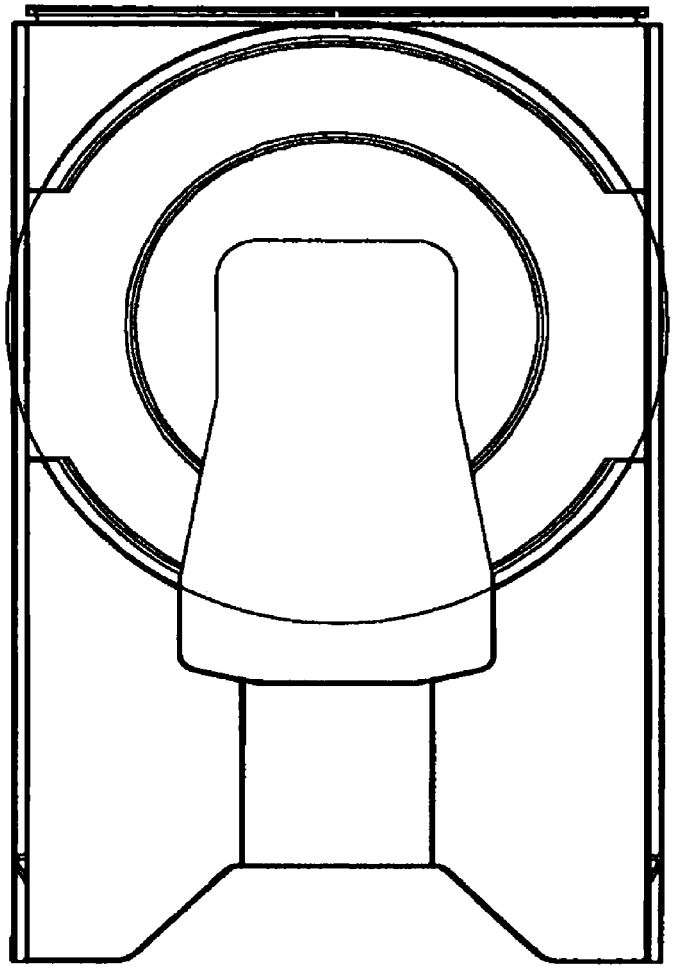
FIG. 1 shows a structural diagram of a front side of a tray of an conventional optical disc drive.
Figure 2:
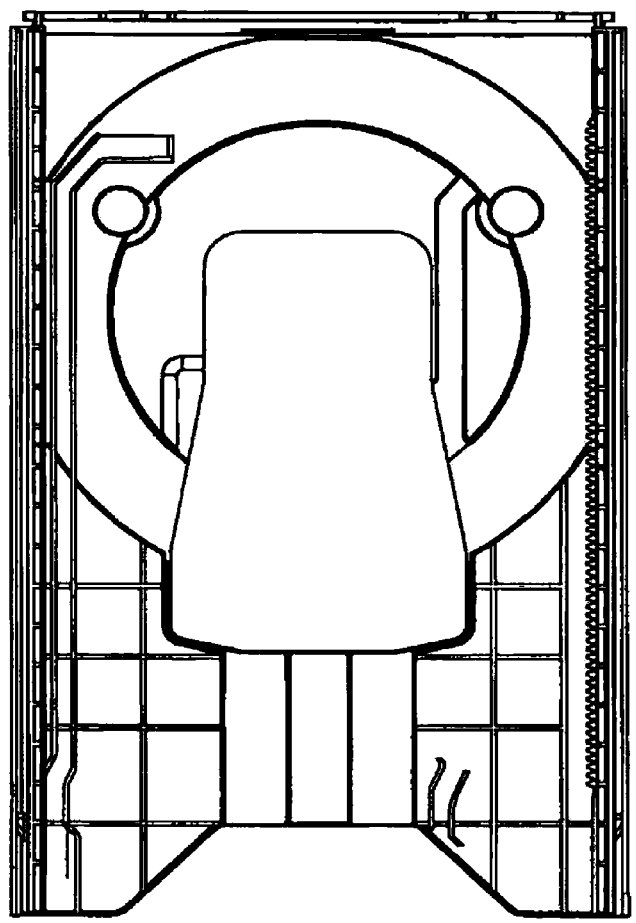
FIG. 2 shows a structural diagram of a back side of the tray of the FIG. 1.
Figure 3:
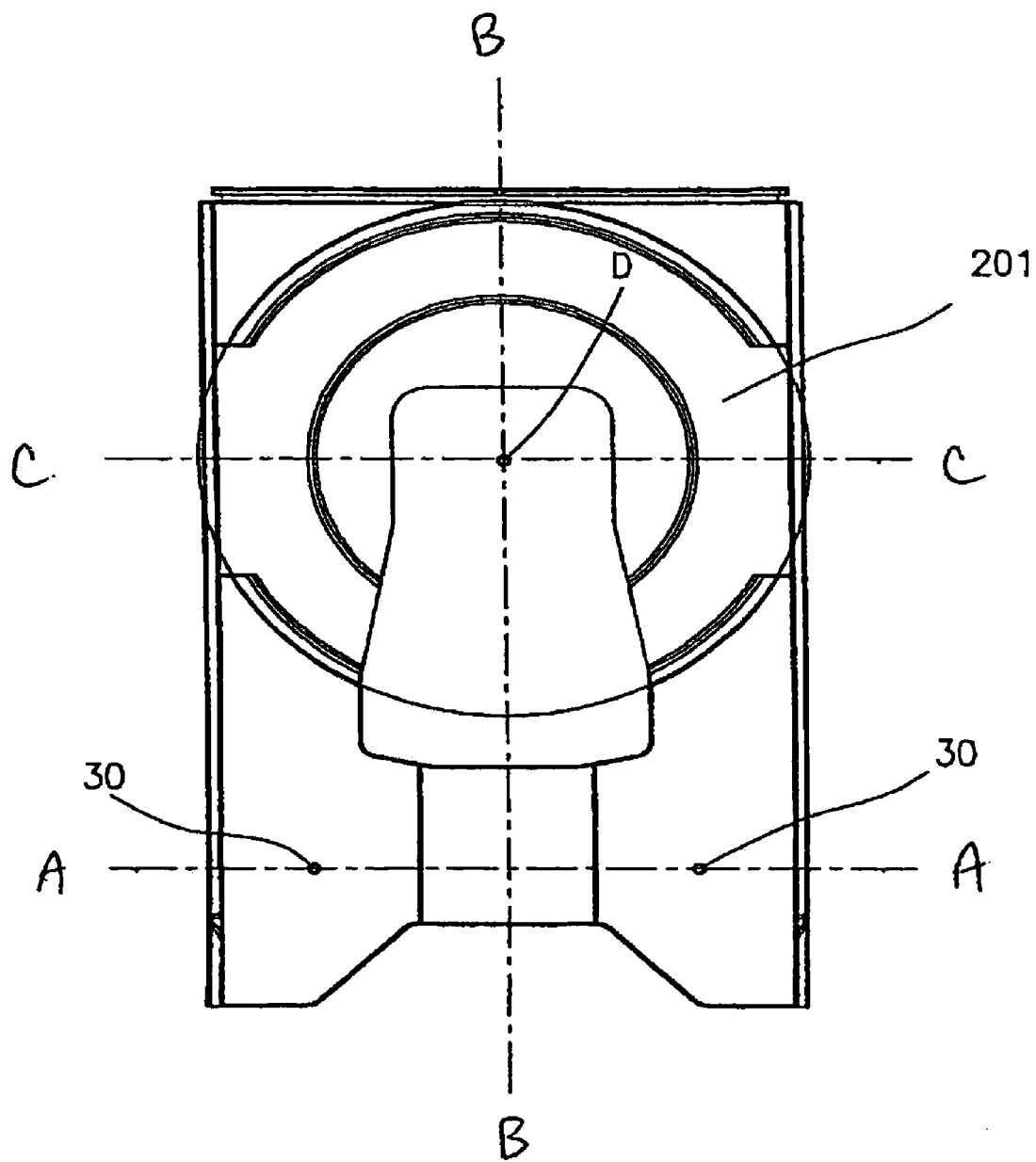
FIG. 3 shows the aligning means arranged in the front side of the tray of the present invention.
Figure 4:
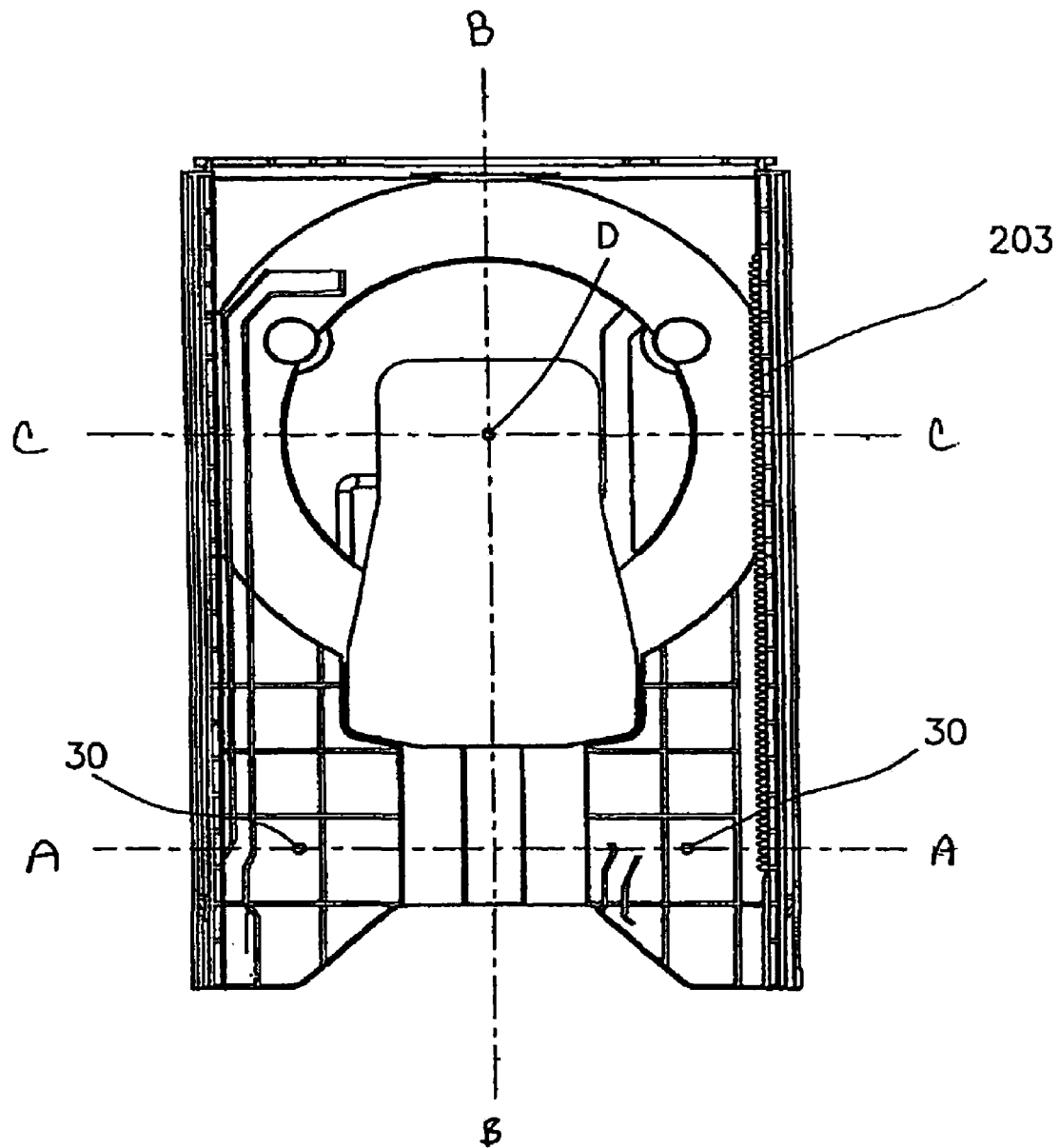
FIG. 4 shows a structural diagram of the back side of the tray corresponding to the aligning means in FIG. 3.

FIG. 3 shows aligning means arranged in the front side of the tray of the present invention, and FIG. 4 shows a structural diagram of the back side of the tray corresponding to the aligning means in FIG. 3. Each component is respectively located on the front side and back side of the tray 20 of the present invention, such as carrier plane 201 for carrying an optical disk, longitudinal rack 203, etc., and aligning means 30 are formed integrally and simultaneously. After the tray 20 is made, e.g. the tray 20 is made of a plastic material in extrusion and formed integrally, for ensuring the made tray 20 completely meets the dimensional requirement of the product specification, it is necessary to measure the tray 20. Since the tray 20 of the present invention has a feature of aligning means 30, the measurer can obtain an aligning line A-A by drawing a line through the aligning means 30. From the aligning line A-A obtained on the front side of the tray 20 and a protruding point D, please refer to the aligning line A-A shown in FIG. 3, an aligning line B-B, aligning line C-C, can be obtained. The protruding point D is a center position of the carrier plane 201. Next, using the protruding point D, each component located on the front side of the tray 20 are measured to determine whether each component completely meets the dimensional requirement of the product specification. For example, measure whether the length of the circumference of the carrier plane 201 completely meets the dimensional requirement of the product specification. Similarly, the measurer can use the aligning means 30 through the back side of the tray 20 and draw a line to obtain an aligning line A-A. From the aligning line A-A obtained on the back side of the tray 20 and a protruding point D, please refer to the aligning line A-A shown in FIG. 4, an aligning line B-B, aligning line C-C can be obtained. The protruding point D is a center position of the carrier plane 201. Next, using the protruding point D, each component located on the back side of the tray 20 are measured to determine whether each component completely meets the dimensional requirement of the product specification. For example, measure whether the longitudinal rack 203 on the back side of the tray 20 completely meets the dimensional requirement of the product specification.

Since each aligning means 30 of the present invention is arranged at exactly the same position on the front surface and the back surface of the tray 20, the aligning lines A-A respectively obtained on the front surface and the back surface of the tray 20 by the measurer are the same aligning lines. The protruding points D on the front surface and the back surface from the same aligning line are the same center point.

The alignment means 30 shown in FIG. 3 and FIG. 4 have embodiments of through holes 30 through the front side and back side of the tray 20. Further, another embodiment of the aligning means 30 is a prominent means projecting outward from the front side and back side of the tray 20, e.g. the prominent means as a spur. Of course, the aligning means 30 of the present invention is not limited to the through hole 30 and the prominent means. Persons skilled in the art can change to other types of aligning means 30 according to the principles disclosed in the present invention. However, these changed types of aligning means 30 are also in the scope of the present invention.

Various modifications, changes, and variations apparent to those skilled in the art may be made in the arrangement, operation, and details of the methods and systems of the present invention disclosed herein without departing from the scope of the claimed invention.

What is claimed is:

1. A tray for use in an optical disc drive, the tray comprising:
  a carrier portion configured to receive and support an optical disc thereon; and means for determining a location of a center portion of the carrier portion, wherein the location of the center portion is a reference location from which dimensional accuracy of components of the tray are determinable.

2. The tray of claim 1, wherein the means for determining comprises an alignment portion configured to define a first line from which the location of the center portion of the carrier portion is determinable.

3. The tray of claim 2, further comprising:
a first side, the carrier portion being arranged on the first side; and
a second side opposite the first side; the alignment portion being configured to define a second line on the second side of the tray collinear with the first line, the location of the center portion of the carrier portion being determinable from the second line.

4. The tray of claim 2 wherein the alignment portion comprises a pair of spaced apart holes and the first line passes through each of the pair of spaced apart holes.

5. The tray of claim 2 wherein the alignment portion comprises a pair of spaced apart projections and the first line passes through each of the pair of spaced apart projections.

6. The tray of claim 1 wherein the means for determining comprises prominent means.

7. The tray of claim 1, wherein dimensional accuracy of the carrier portion is determinable from the reference location.

8. A tray for use in an optical disc drive, the tray comprising:
a body portion having a carrier portion configured to receive and support an optical disc thereon;
a plurality of alignment portions configured to define a first line, wherein a position of a second line and a position of a third line are determinable using the first line as a reference; and
a center reference location positioned at an intersection of the second line and the third line, wherein dimensional accuracy of the body portion relative to a specification is determinable using the center reference location as a reference.

9. The tray of claim 8, wherein a center protrusion is located at the center reference location.

10. The tray of claim 8, wherein each of the plurality of alignment portions comprises a hole and the first line passes through the holes in the plurality of alignment portions.

11. The tray of claim 8, wherein each of the plurality of alignment portions comprises a projection and the first line passes through the projections in the plurality of alignment portions.

12. The tray of claim 8, wherein each of the plurality of alignment portions is spaced apart from the carrier portion.

13. A method for use with a tray having a carrier portion configured to carry an optical disc, and a pair of alignment portions, the method comprising:
determining a location of a center of the carrier portion based on the locations of the pair of alignment portions; and
determining whether the tray complies with a design specification by measuring a dimension of the tray relative to the location of the center of the carrier portion.

14. The method of claim 13 wherein the pair of alignment portions comprise a pair of spaced apart alignment holes, and determining the location of the center of the carrier portion based on the locations of the pair of alignment portions comprises identifying a first line passing through the alignment holes and determining the location of the center of the carrier portion based on the first line.

15. The method of claim 14 wherein determining the location of the center of the carrier portion based on the first line comprises identifying a second line substantially orthogonal to and intersecting the first line and identifying a third line substantially parallel to and spaced apart from the first line, the center of the carrier portion being located at an intersection of the second and third lines.

16. The method of claim 13, wherein the dimension of the tray measured relative to the location of the center of the carrier portion is a length of a circumference of the carrier portion.

17. A method for use with a first design specification, a second design specification, and a tray having a pair of alignment portions, a first side with a carrier portion configured to carry an optical disc, and a second side with a rack, the method comprising:
constructing a first line passing through the pair of alignment portions on the first side of the tray;
determining a first location of a center of the carrier portion based on the first line;
determining whether the first side of the tray complies with the first design specification by measuring a dimension of the first side of the tray relative to the first location of the center of the carrier portion and comparing the measured dimension to the first design specification;
constructing a second line passing through the pair of alignment portions on the second side of the tray, the second line being collinear with the first line;
determining a second location of a center of the carrier portion based on the second line; and
determining whether the second side of the tray complies with the second design specification by measuring a dimension of the second side of the tray relative to the second location of the center of the carrier portion, and comparing the measured dimension to the second design specification.

18. The method of claim 17, wherein the dimension of the first side of the tray measured relative to the first location of the center of the carrier portion is a length of a circumference of the carrier portion.

19. The method of claim 17, wherein the dimension of the second side of the tray measured relative to the second location of the center of the carrier portion is a dimension of the rack.

* * * * *